US005513063A

United States Patent [19]

Wu

[11] Patent Number: 5,513,063

[45] Date of Patent: Apr. 30, 1996

[54] COMBINED ELECTRICAL PLUG AND CIRCUIT BREAKER

[76] Inventor: Well S. Wu, P.O. Box 82-144, Taipei, Taiwan

[21] Appl. No.: 161,668

[22] Filed: Dec. 6, 1993

[51] Int. Cl.$^{6}$ .............................. H02H 5/04

[52] U.S. Cl. .............................. 361/105; 337/68

[58] Field of Search .............................. 361/105, 45; 439/668, 439/700; 337/68, 85, 148

[56] References Cited

U.S. PATENT DOCUMENTS 4,573,031 2/1986 Krasser .............................. 337/68

*Primary Examiner*—A. D. Pellinen
*Assistant Examiner*—Michael J. Sherry
*Attorney, Agent, or Firm*—Alfred Lei

[57] ABSTRACT

A combined electrical plug and circuit breaker that interrupts current when excessive current flows. A housing receives a body portion with extending blades. A bi-metallic strip opens silver contacts when an overload occurs. A rod member can reset the contacts when the overload problem is solved.

1 Claim, 5 Drawing Sheets

COMBINED ELECTRICAL PLUG AND CIRCUIT BREAKER

BACKGROUND OF THE INVENTION

It has been found that the prior art combined electrical plug and circuit breaker has a lot of drawbacks and is unfit for practical use. As shown in FIG. 7, the electrical plug and circuit breaker mainly comprises a housing 6, an insulating plate 7 and a bi-metallic strip 8. The housing 6 is formed with a pair of slots 60 at one end, a guiding groove 61 in the intermediate portion, and a recess 62 at the other end. Further, the right end of the housing 6 is engaged with a cover 63. A pushbutton 64 is pivotally mounted in the housing 6. The slots 60 are designed to receive blades 65 and 66 which extend out of the housing 6. In the guiding groove 61 is fitted the insulating plate 7 which has an opening 70 at its intermediate portion and contacts the pushbutton 64 at the rear end. A spring 62 is disposed in the recess 62 of the housing, with its one end urging against the recess and its other end against the pushbutton 64. The bi-metallic strip 8 is mounted in the housing 6 so that its one end is in contact with the blade 65 and its the other end having a silver contact 80 extends through the opening 70 to contact the blade 66.

However, such a combined electrical plug and circuit breaker has the following drawbacks:

1. The spring 67 cannot move smoothly and often gets out of its position.
2. As it is necessary to convert the revolving motion of the pushbutton 64 into linear motion of the insulating plate 7, the insulating plate 7 cannot work smoothly thereby often causing the silver contact 80 unable to get out of the opening 70 of the insulating plate 7.
3. The assembly is difficult and time-consuming.

Therefore, it is an object of the present invention to provide an improved combined electrical plug and circuit breaker which may obviate and mitigate the above-mentioned drawbacks.

SUMMARY OF THE INVENTION

This invention relates to an circuit breaker.

It is the primary object of the present invention to provide a combined electrical plug and circuit breaker which will automatically interrupt the flow of an electric current when the current becomes excessive.

It is another object of the present invention to provide a combined electrical plug and circuit breaker which is facile to use.

It is still another object of the present invention to provide a combined electrical plug and circuit breaker which is simple in construction.

It is still another object of the present invention to provide a combined electrical plug and circuit breaker which is economic to produce.

It is a further object of the present invention to provide a combined electrical plug and circuit breaker which is easy to assemble.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
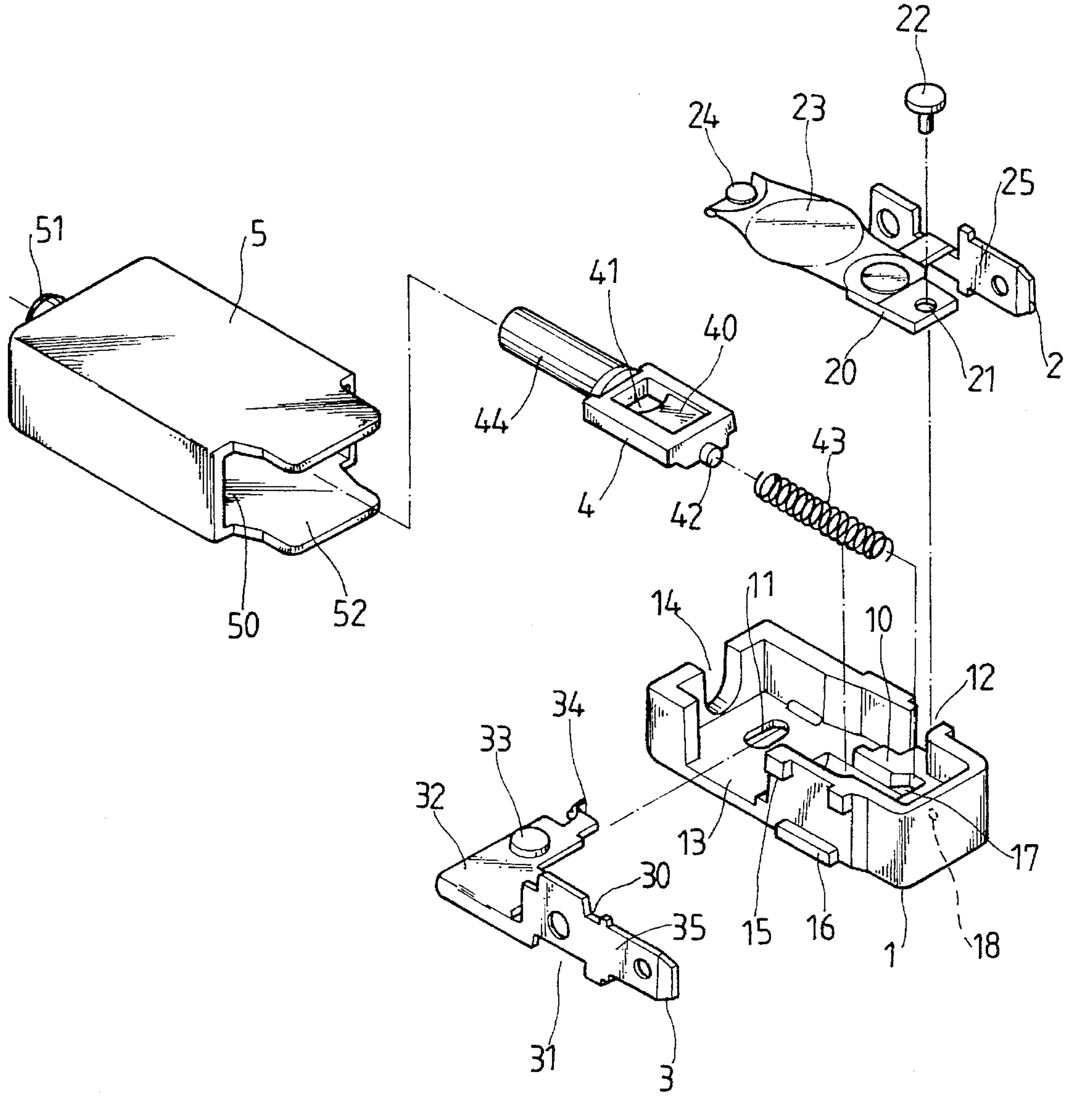
FIG. 1 is an exploded view of the present invention.
Figure 2:
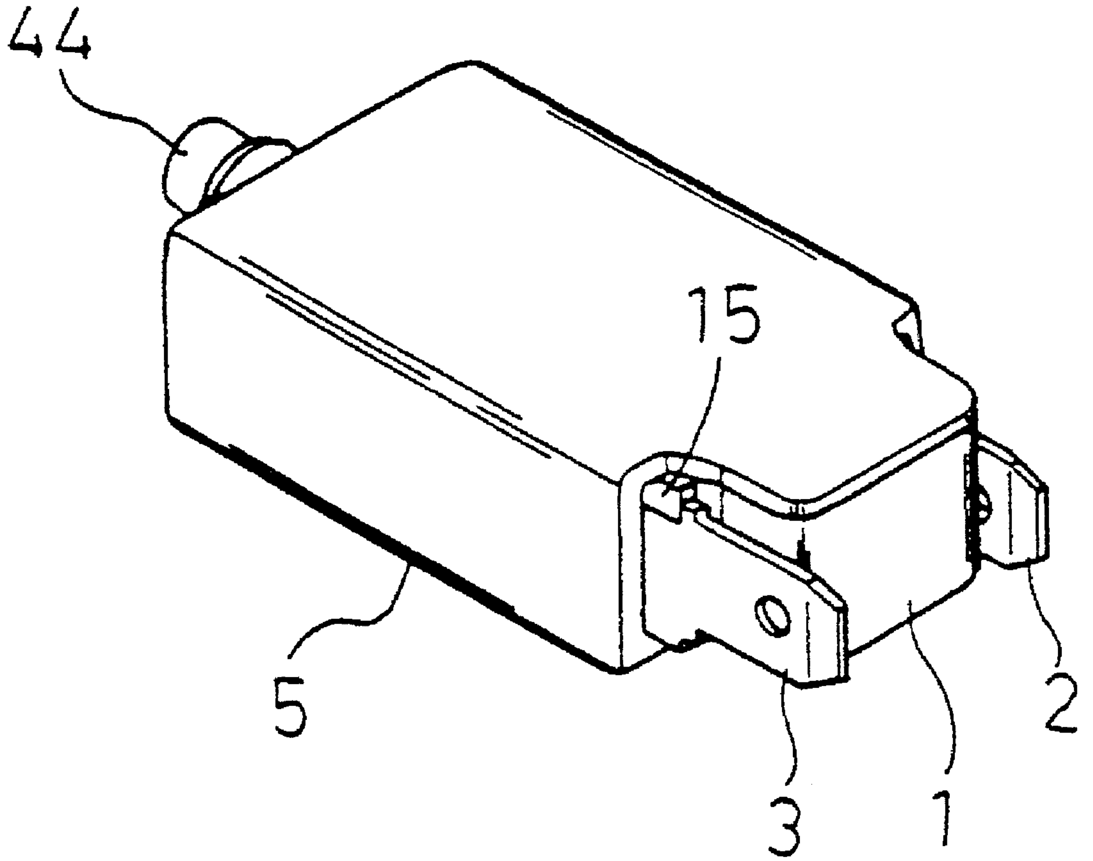
FIG. 2 is a perspective view of the present invention.
Figure 4:
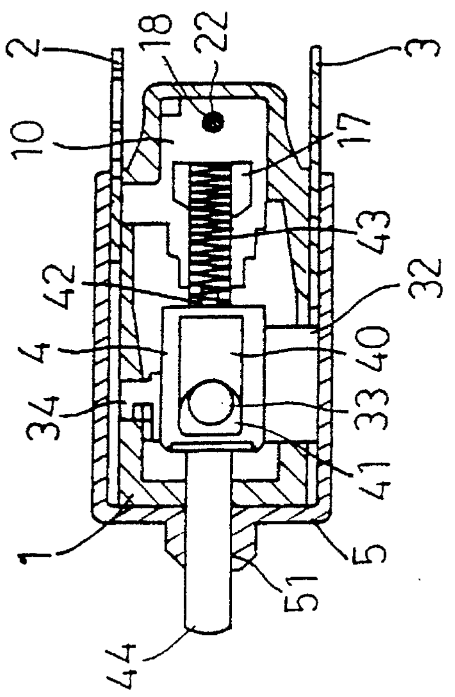
FIG. 4 is a sectional top view of the present invention.
Figure 3:
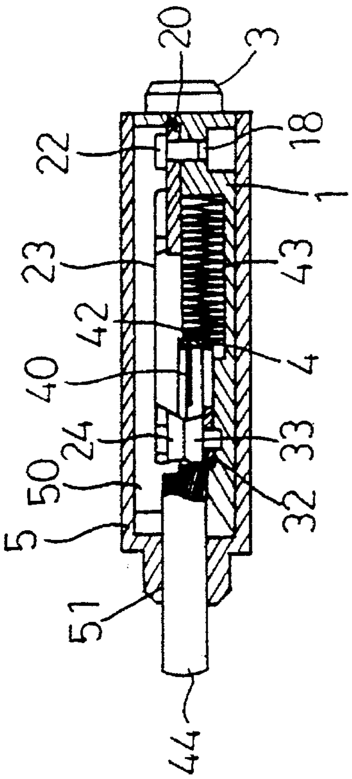
FIG. 3 is a sectional side view of the present invention.
Figure 5:
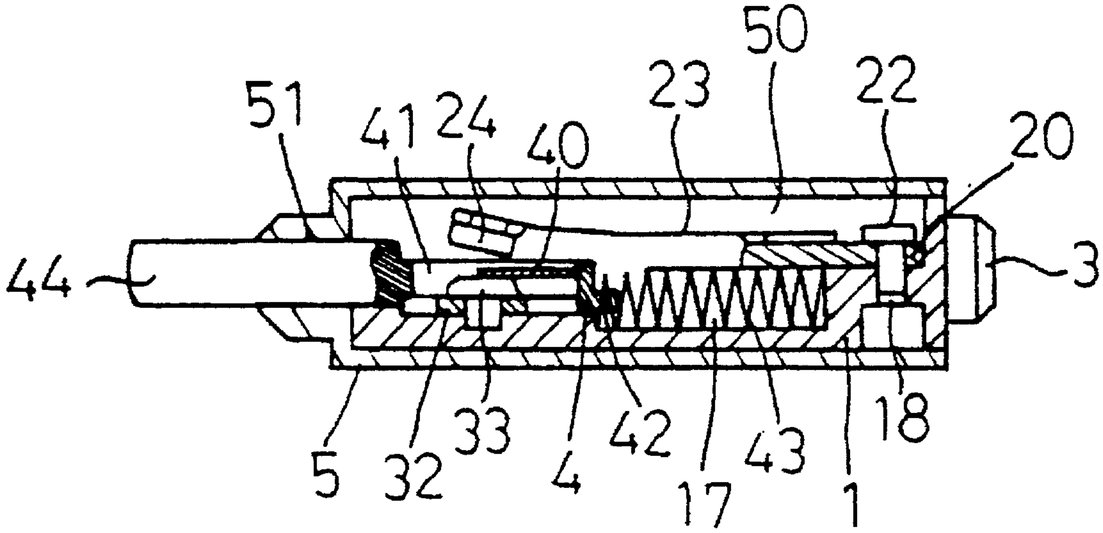
FIGS. 5 and 6 show the working principle of the present invention.
Figure 6:
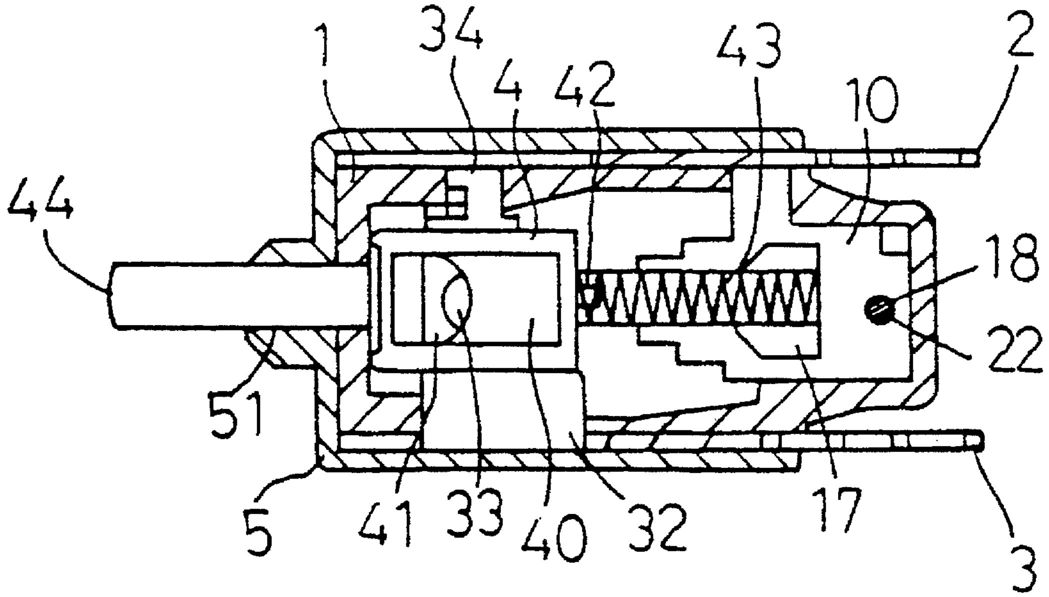
Figure 7:
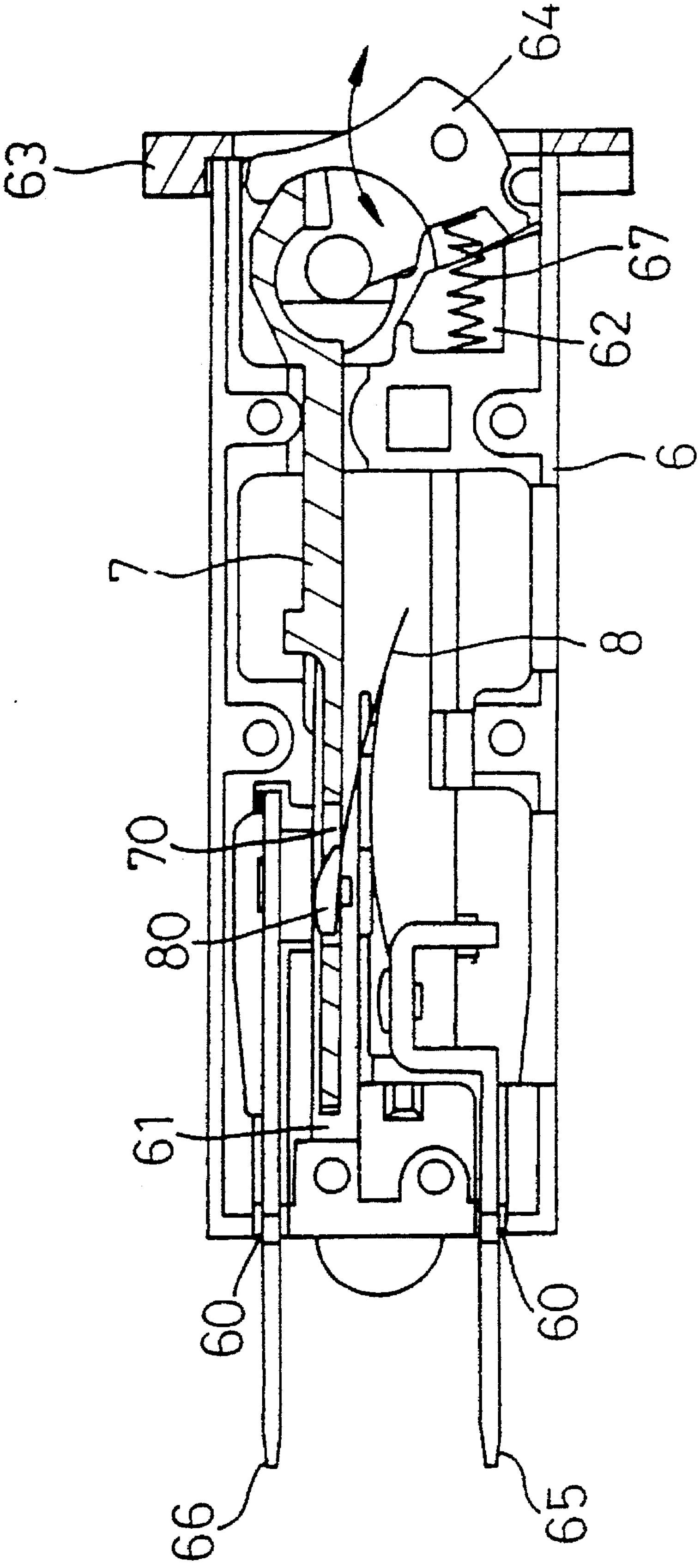
PRIOR ART FIG. 7
FIG. 7 is a sectional view of a prior art circuit breaker.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the combined electrical plug and circuit breaker according to the present invention mainly comprises a body portion 1, a first terminal 2, a second terminal 3, an insulator mount 4, and a housing 5.

The body portion 1 is with a seat 10 and a slot 11 at the bottom, a first opening 12 at one side, a second opening 13 at the other side, and a notch 14 at the end side. On the outer side of the body portion 1 there are two upper protuberances 15 and a raised elongated member 16 below the upper protuberances 15. The seat 10 is formed with a groove 17 and a hole 18.

The first terminal 2 is provided with a lug 20 having a hole 21 at one end and a bi-metallic strip at another end. The lug 20 has a blade 25 extending therefrom. Further, the first terminal is fixedly mounted in the body portion 1 by a screw 22, with the hole 21 of the terminal 2 aligned with the hole 18 of the body portion 1 and the blade 25 extending out of the first opening 12 of the body portion 1. In addition, the bi-metallic strip 23 has a silver contact 24 at the end.

The second terminal 3 is formed with a fixing portion having a silver contact 33 and a hook and a blade 35 having an upper notch 30 and a lower notch 31. The second terminal 3 is also fixedly mounted in the body portion 1, with its upper notch 30 and lower notch 31 respectively engaged with the upper protuberance 15 and the raised elongated member 16 of the body portion 1, its hook 34 disposed within the slot 11 of the body portion 1, its silver contact 33 contacting the silver contact 24 of the first terminal 2, and its blade 35 extending out of the second opening 13 of the body portion 1.

The insulator mount 4 is formed with an opening 41 in which is fitted an insulating partition 40. In addition, the insulator mount 4 is provided with a pin 42 for engaging a spring 43 at one end and a rod member 44 at another end. The insulator mount 4 is fitted between the first terminal 2 and the second terminal 3 with its rod member 44 supported on the notch 14 of the body portion 1. A spring 43 is disposed between the pin 42 of the insulator mount 4 and the hole 18 of the body portion 1.

The housing 5 is formed with an opening 52 at one end, a hole 51 at the other end, and a chamber 50 in its interior. The chamber 50 of the housing 5 is used to receive the body portion 1 on which are fitted the first terminal 2, the second terminal 3 and the insulator mount 4 so that the rod member 44 of the insulator mount 4 extends through the hole 51 of the housing 5.

As the load (not shown) connected to the first and second terminals 2 and 3 is over a predetermined value, the bi-metallic strip 23 will deform in shape thereby causing the silver contact 24 to go upwardly out of the opening 41 of the insulator mount 4 and therefore, cutting off the connection between the load and the present invention. In the meantime, the insulator mount 4 is pushed by the spring 43 to go forward thus moving the insulating partition 40 of the insulator mount 4 to a position between the silver contact 24 of the bi-metallic strip 23 and the silver contact 33 of the second terminal 3 and pushing the rod member 44 of the insulator mount 4 further out of the housing 5. As the over load problem is solved, it is only necessary to press the rod member 44 of the insulator mount 4 and the partition plate 40 of the insulator mount 4 is pushed inward thereby making the two silver contacts 24 and 33 get in touch each other again.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A combined electrical plug and circuit breaker comprising:

a body portion (1) formed with a seat (10) and a slot (11) at a bottom thereof, a first opening (12) at one side thereof, a second opening (13) at another side thereof, and a notch (14) at an end side thereof, said body portion (1) being formed at said one side with two upper protuberances (15) and a raised elongated member (16) below said upper protuberances (15), said seat (10) being formed with a groove (17) and a first hole (18);

a first terminal (2) provided with a lug (20) having a second hole (21) at one end thereof and a bi-metallic strip (23) at another end, said lug (20) having a blade (25) extending therefrom, said first terminal (2) being fixedly mounted in said body portion (1) by a screw (22) with said second hole (21) aligned with said first hole (12) and said blade (35) extending out of said first opening (12), said bi-metallic strip (23) having a first silver contact (24) at an end thereof;

a second terminal (3) including a blade (35) having an upper notch (30) and a lower notch (31) and a fixing portion having a second silver contact (33) and a hook (34), said second terminal (3) being fixedly mounted in said body portion (1), with said upper notch (30) and said lower notch (31) respectively engaged with one of said upper protuberances (15) and said raised elongated member (16) of said body portion (1), said hook (34) being disposed within said slot (11), said second silver contact (33) contacting said first silver contact (24), and said blade (35) extending out of said second opening (13);

an insulator mount (4) formed with a third opening (41) in which is fitted an insulating partition (40), said insulator mount (4) being provided with a pin (42) for engaging a spring (43) at one end thereof and a rod member (44) at another end thereof, said insulator mount (4) being fitted between said first terminal (2) and said second terminal (3) with said rod member (44) supported on said notch (14), said spring (43) being fitted between said pin (42) and an inner end wall of said body portion (1); and a housing (5) having a fourth opening (52) at one end thereof, a third hole (51) at another end thereof, and a chamber (50) in interior adapted to receive said body portion (1).

* * * * *